United States Patent [19]

Ouchi et al.

[11] Patent Number: 5,467,232

[45] Date of Patent: Nov. 14, 1995

[54] MAGNETIC RECORDING AND REPRODUCING METHOD USING PHASE DISCRIMINATION AND APPARATUS THEREFOR

[75] Inventors: Yasuhide Ouchi, Kodaira; Naoki Sato, Kokubunji; Hideki Sawaguchi, Kodaira; Yosuke Hori, Hiratsuka, all of Japan

[73] Assignee: Hitachi, Ltd., Tokyo, Japan

[21] Appl. No.: 36,280

[22] Filed: Mar. 24, 1993

[30] Foreign Application Priority Data

Mar. 24, 1992 [JP] Japan .................................... 4-065789

[51] Int. Cl.[6] .......................... G11B 5/035; G11B 5/09; G11B 27/10; H03H 7/30
[52] U.S. Cl. ................. 360/65; 360/46; 360/51; 375/229
[58] Field of Search .................. 360/45, 46, 51, 360/65; 375/12, 11, 14, 101

[56] References Cited

U.S. PATENT DOCUMENTS

| | | | |
|---|---|---|---|
| 3,697,689 | 10/1972 | Gibson | 178/69.5 R |
| 4,872,184 | 10/1989 | Yamaguchi et al. | 375/14 |
| 4,972,276 | 11/1990 | Wadaya et al. | 360/46 |
| 5,008,761 | 4/1991 | Nishiyama et al. | 360/45 |
| 5,068,753 | 11/1991 | Kanegae | 360/65 |

FOREIGN PATENT DOCUMENTS

| | | |
|---|---|---|
| 57-88511 | 6/1982 | Japan . |
| 62-42368 | 2/1987 | Japan . |

Primary Examiner—Aristotelis Psitos
Assistant Examiner—W. Chris Kim
Attorney, Agent, or Firm—Antonelli, Terry, Stout & Kraus

[57] ABSTRACT

In a phase discrimination signal processing system in the signal reproduction of a magnetic recording and reproducing apparatus, instead of differentiation of a reproduced signal, amplitude discrimination automatic equalization is effected for an isolated waveform at a phase discrimination point corresponding to an isolated magnetization reversal reproduced by a magnetic head such that an amplitude at each discrimination time other than a peak point is zero to effect phase discrimination of the signal waveform.

22 Claims, 5 Drawing Sheets

F I G. 4
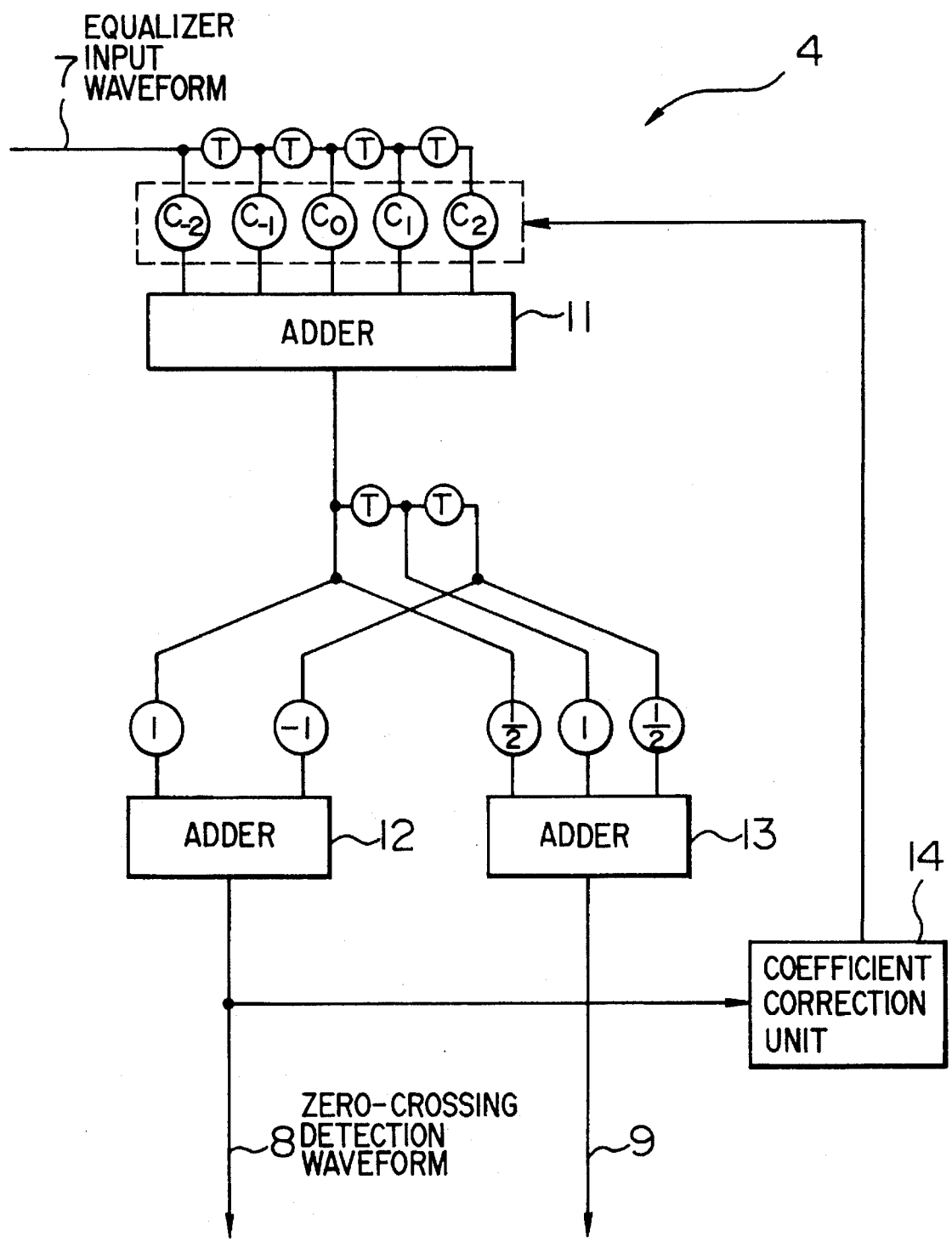

MAGNETIC RECORDING AND REPRODUCING METHOD USING PHASE DISCRIMINATION AND APPARATUS THEREFOR

BACKGROUND OF THE INVENTION

The present invention relates to a magnetic recording and reproducing method for recording and reproducing digital information and to an apparatus therefor, and more particularly to a magnetic recording and reproducing method suitable for reshaping a waveform by using an automatic equalizer in the reproduction of a digitally recorded signal and to a recording and reproducing apparatus for practising it.

In reproducing a recorded signal in a prior art magnetic recording and reproducing apparatus, particularly a magnetic disk drive, a phase discrimination system has been adopted. For example, in JP-A-57-88511, a reproduced signal waveform is reshaped by two equalizers to attain substantially perfect equalization, and then a pulse corresponding to a peak of the reproduced signal is generated by differentiation so that "1" and "0" are discriminated by the presence or absence of the pulse. In JP-A-57-88511, it is assumed that a zero-crossing point of the differentiated signal does not shift if a shift of a peak point of the reproduced signal waveform is eliminated by the use of a plurality of equalizers.

In JP-A-62-42368, an equalization constant in equalizing a reproduced signal waveform is switched between an inner track and an outer track of a magnetic disk, because degrees of interference which the reproduced signal waveform receives differ between the inner track and the outer track of the magnetic disk due to a difference of a recording density.

SUMMARY OF THE INVENTION

However, in the prior art waveform equalization method in the signal reproducing circuit, it is not possible to set an equalization constant which principally renders a peak shift to zero because, in the prior art, the zero-crossing pulse of the waveform differentiated after the waveform equalization is detected. It is assumed that discrimination times come at a predetermined time interval, and zero-crossing of a peak of an isolated waveform corresponding to one discrimination time is to be detected. The isolated waveform is equalized by an equalization constant which is considered optimum, and it is differentiated. In the prior art, a peak shift of the isolated waveform derived from the reproduced signal waveform may be adjusted by equalizing the reproduced signal waveform by a plurality of equalizers or preparing a plurality of equalization constants and selectively using them. However, the inventors considered that the peak shift is due to the amplitude shift of the zero-crossing point of the differentiated output because the peak detection of the isolated waveform corresponds to the zero-crossing point of the differentiated output. Namely, the amplitude shift of the zero-crossing point takes place when the differentiated output is not zero at the phase discrimination point at which the peak of the isolated waveform is to be detected. If only the isolated waveform is involved, the differentiated output would be zero at the discrimination time (peak point) but a small amplitude shift appears due to the interference by other isolated waveforms. As a result, in the reproduction of a continuous signal, it is not possible to make an amplitude zero at each discrimination time other than the zero-crossing time corresponding to the peak of the isolated waveform, and the zero-crossing points vary in various waveform patterns. In the prior art, the shift of the zero-crossing point must be eliminated because it uses the differentiation. To this end, it is necessary to set an equalization constant such that the amplitude at each discrimination time is zero. However, taking a variation of performance of a magnetic head and a magnetic disk into consideration, it is very difficult to set a specific equalization constant. Even if a plurality of equalization constants are set and they are selectively used in accordance with a radial position, it is practically impossible to control the peak shift to zero.

It is an object of the present invention to provide a waveform equalization method which makes a peak shift to zero in the signal reproduction using a phase discrimination system, and an apparatus for practising it. It is a more specific object of the present invention to provide a method for eliminating the peak shift without using a differentiation circuit for producing a zero crossing pulse in the phase discrimination method and reshaping the waveform, and a signal processing circuit for practising it.

In order to achieve the above objects, the present invention uses the following means and method.

In a isolated waveform at a phase discrimination point corresponding to an isolated magnetization reversal reproduced by the magnetic head, automatic equalization is effected to make an amplitude zero at each discrimination time other than a zero-crossing point corresponding to recorded magnetization reversal. To this end, instead of a differentiated waveform used in the prior art phase discrimination method to produce the zero-crossing pulse, the automatic equalization for amplitude discrimination is effected to make the amplitude of the waveform zero at each discrimination time other than the peak point to produce a Nyquist waveform, and two such Nyquist waveforms of opposite polarities are superimposed with an offset interval of two bits to produce a waveform which is a substitute of the differentiated waveform. As a result, the amplitude is zero at each discrimination time other than the zero-crossing point in the signal discrimination waveform and no peak shift takes place.

In accordance with the present invention, in a magnetic recording and reproducing method for reproducing a digitally recorded signal by the phase discrimination method, a reproduced output waveform corresponding to isolated magnetization reversal reproduced by a magnetic head is transformed to a zero-crossing detection waveform by a phase discrimination transversal equalizer without using a differentiation circuit, and the signal is processed by a circuit which discriminates the zero-crossing point of the zero-crossing detection waveform as a bit "1". There is provided a circuit for producing a plurality of Nyquist waveforms having positive and negative polarities derived from the reproduced output waveform corresponding to the isolated magnetization reversal and adding the waveforms staggered in time from each other, by the phase discrimination transversal equalizer which reshapes it to the zero-crossing detection waveform. Normally, a circuit for applying a waveform passed through an automatic gain controller and a low pass filter to the phase discrimination transversal equalizer is provided.

In the signal recording and reproducing method of the present invention, the signal is processed by using a first phase discrimination transversal equalizer for producing a Nyquist waveform having such a top interval that a bit interval after modulation is equal to T, delay means for delaying an output waveform from the equalizer by 2T, and a second phase discrimination transversal equalizer for adding the two Nyquist waveforms before and after the delay means in opposite polarities to produce a zero-crossing isolated waveform.

In the present invention, a signal is processed by using a first phase discrimination transversal equalizer for producing a Nyquist waveform having such a tap interval that a bit interval after modulation is equal to T, and a third phase discrimination transversal equalizer for delaying the output waveform of the first phase discrimination transversal equalizer by 2T, and adding three waveforms with a center tap coefficient and one-half tap coefficient for taps adjacent to a center tap, to produce a gating waveform. The first phase discrimination transversal equalizer is preferably a phase discrimination automatic equalizer which automatically produces a Nyquist waveform.

The signal may be processed by using a single transversal Nyquist waveform forming automatic equalizer having such a tap interval that a bit interval after modulation is equal to T to equalize the waveform such that a reproduced output waveform corresponding to the isolated magnetization reversal is transformed to a waveform with an amplitude sequence of "- - -, 0, 0, 1, 0, −1, 0, 0, - - -" at the every bit interval T. A one-to-seven modulation method in which a minimum value of a zero run length is "1" is preferably used.

The magnetic recording and reproducing apparatus of the present invention for reproducing a digitally recorded signal by using a phase discrimination circuit comprises a phase discrimination transversal equalizer for transforming a reproduced output waveform of a magnetic head corresponding to the isolated magnetization reversal to a zero-crossing detection waveform, and a signal processing circuit for discriminating the zero-crossing point of the zero-crossing detection waveform as bit "1".

The phase discrimination transversal equalizer has a signal processing circuit for producing a plurality of Nyquist waveforms with positive and negative polarities, derived from the reproduced magnetization reversal and adding the waveforms after staggering in time to produce a zero-crossing detection waveform. It may have a signal processing circuit for applying a signal passed through an automatic gain controller and a low pass filter to the phase discrimination transversal equalizer.

Specifically, the magnetic recording and reproducing apparatus of the present invention comprises a first phase discrimination transversal equalizer for producing a Nyquist waveform having such a tap interval that a bit interval after the modulation is equal to T, delay means for delaying an output waveform of the equalizer by 2T, and a second phase discrimination transversal equalizer for adding the two Nyquist waveform with opposite polarities before and after the delay means to produce a zero-crossing detection waveform.

In the application, it may comprise a third phase discrimination three taps transversal equalizer for delaying the output waveform of the first phase discrimination transversal equalizer by 2T, and adding three waveforms with a center tap coefficient and one-half tap coefficient for taps adjacent to a center tap, to produce a gating pulse. The first phase discrimination transversal equalizer is preferably a phase discrimination automatic equalizer which automatically produces a Nyquist waveform. The equalizer may comprise a single transversal Nyquist waveform forming automatic equalizer having such a tap interval that a bit interval after the modulation is equal to T to equalize the waveform such that a reproduced output waveform corresponding to the isolated magnetization reversal is transformed to a waveform with an amplitude sequence of "- - - 0, 0, 1, 0, −1, 0, 0, - - -" at the every bit interval T. It preferably comprises a signal processing circuit for one-to-seven modulation in which a minimum value of a zero run length is "1".

The signal processing circuit in the present invention may be an integrated circuit, and the magnetic recording and reproducing apparatus may be constructed by the integrated circuit.

As described above, instead of the differentiated waveform used in the prior art phase discrimination method to produce the zero-crossing pulse, the amplitude discrimination automatic equalization is effected such that the amplitude of the waveform is zero at each discrimination time other than the peak point to produce a Nyquist waveform, and two Nyquist waveforms of opposite polarities are superimposed with stagger of 2-bit intervals to produce a waveform which is a substitution of the differentiated waveform. As a result, the amplitude of the signal discrimination waveform is zero at each discrimination time other than the zero-crossing point and no peak shift takes place. Namely, the zero-crossing pulse is produced like the differentiated waveform, and the amplitude is zero at each discrimination time other than the zero-crossing point so that the peak shift can be perfectly eliminated.

BRIEF DESCRIPTION OF THE DRAWINGS

FIG. 4 shows another configuration of the phase discrimination automatic equalizer of the magnetic recording and reproducing apparatus of the present invention.

DESCRIPTION OF THE PREFERRED EMBODIMENTS

An embodiment of the present invention is now explained with reference to the drawings.

Figure 7:
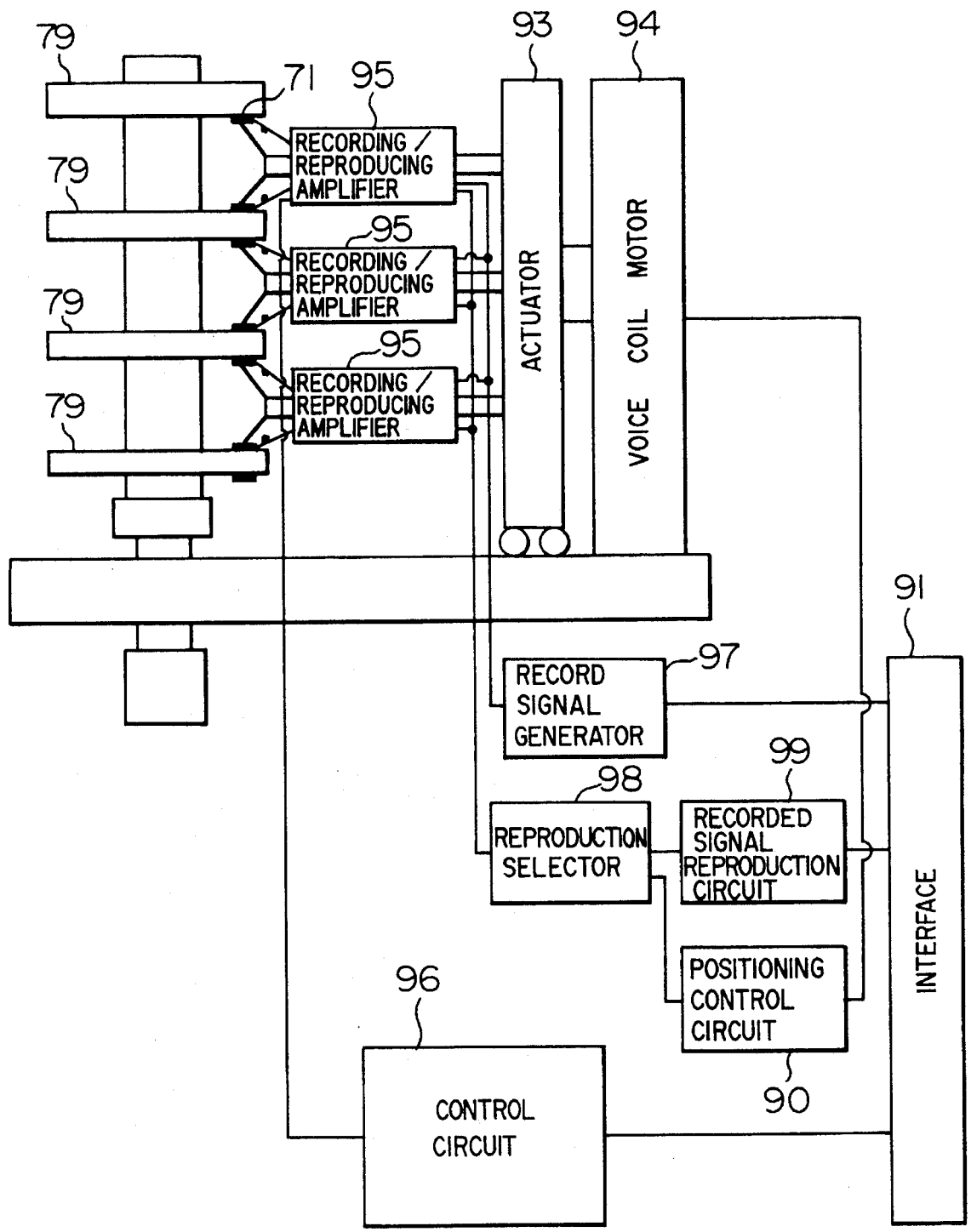
FIG. 7 shows a block diagram of the magnetic recording and reproducing apparatus of the present invention.

FIG. 7 shows an overall configuration of a magnetic recording and reproducing apparatus which uses the signal reproducing process of the present invention. It comprises one or a plurality of magnetic disks 79, a magnetic head slider 71 for mounting a magnetic head arranged for each magnetic disk surface, an actuator 93 for driving the magnetic head slider along the magnetic disk surface, a voice coil motor 94 for driving the actuator, a recording and reproducing amplifier 95, a control circuit 96 for controlling the switching of a record/reproduce mode and the selection of the head, a circuit 97 for generating a record signal, and an interface circuit 91 for interfacing with an external device and overall control. The control circuit 96 instructs the selection of a reproducing head to a reproduction selection circuit 98, and the reproduced signal is transformed to data by a reproduction circuit 99. A servo signal and a positioning control signal recorded on the magnetic disk plane are processed by a positioning control circuit 90, which controls the voice coil motor 94.

Figure 2A:
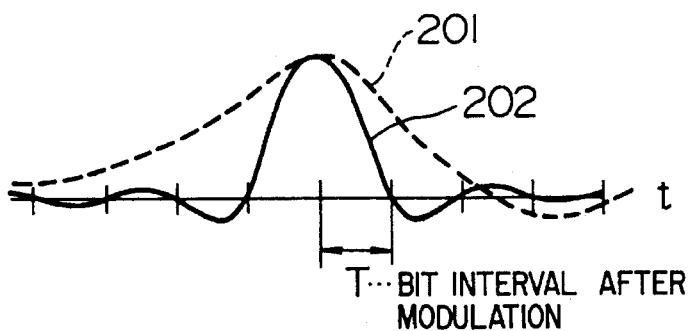
FIGS. 2A–2C illustrate a principle of the magnetic recording and reproduction of the present invention.
Figure 2B:
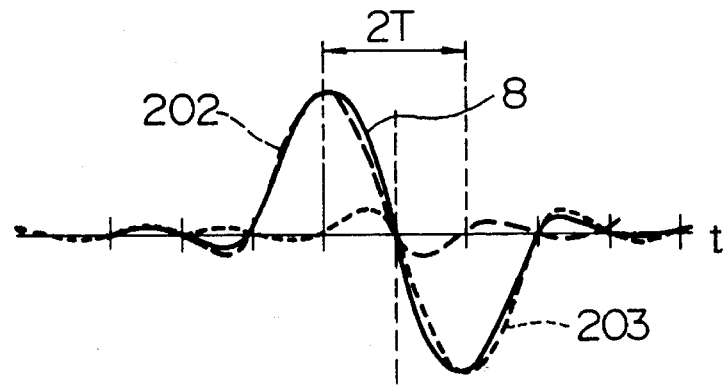
Figure 2C:
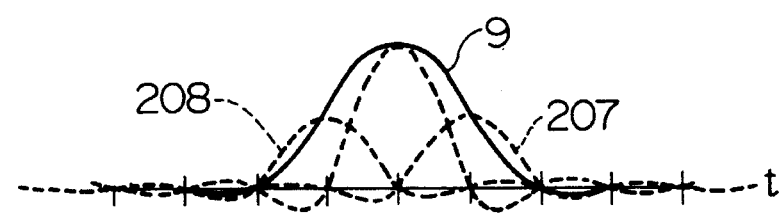

A principle of reproduced signal processing in the reproduction circuit 99 of the present invention is now explained with reference to FIGS. 2A–2C.

In the present embodiment, a one-to-seven modulation system is adopted, and it is assumed that a bit interval after the modulation is equal to T. Other modulation systems may be used to practice the present invention so long as the bit interval after the modulation is assured. FIG. 2A shows an output waveform 201 corresponding to isolated magnetization reversal reproduced by the magnetic head 1 of FIG. 1.

In the present invention, in order to eliminate the zero-crossing point shift of the differential output of the output waveform, a waveform corresponding to the differentiated waveform of the prior art is produced without using the differentiation process to detect the zero-crossing point.

The waveform corresponding to the differentiated waveform is produced in the following manner.

The output waveform 201 of the head is first transformed to a Nyquist waveform h(t) 202 which has zero amplitude at a bit interval T. Then, as shown in FIG. 2B, the Nyquist waveform h(t) 202 is delayed by a 2-bit (2T) period with the opposite polarity to produce a Nyquist waveform $-h(t-2T)$ 203, which is then added to the Nyquist waveform h(t) 202 to produce a zero-crossing detection waveform $D(t)=h(t)-h(t-2T)$ 8 which is a substitution of the prior art differentiated waveform. In the one-to-seven modulation system, one-to-seven "0" bits always exist between "1" bits so that adjacent bits are spaced by 2T or more. Accordingly, as shown in FIG. 2B, if the amplitude is zero at each discrimination time spaced by 2T or more from other, the zero-crossing point which indicates a peak of a waveform pattern is not shifted and no peak shift takes place whatever the wave pattern is. A gating waveform E(t) 9 for extracting a zero-crossing pulse which exactly corresponds to the magnetization reversal may be formed into a waveform as shown in FIG. 2C. Namely, the gating pulse which does not include adjacent zero-crossing point is formed. The one-to-seven modulation system has been explained. Where another modulation system is used, the zero-crossing detection waveform 8 and the gating waveform 9 may be formed while taking the run length of the bit "1" and the bit "0" into consideration.

In the present invention, the above operation is attained by a phase discrimination automatic equalizer 4.

Figure 1:
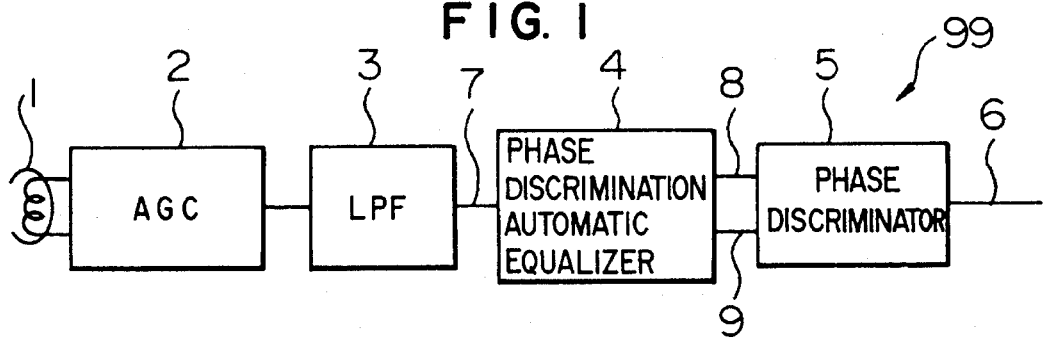
FIG. 1 shows a block diagram illustrating reproduced signal processing of the present invention.

FIG. 1 shows the reproduced signal processing components of the magnetic recording and reproducing apparatus which uses the phase discrimination automatic equalizer of the present invention. In FIG. 1, a waveform reproduced by a magnetic head 1 is amplified by an AGC (automatic gain controller) 2 and is passed through a LPF (low pass filter) 3 to produce equalizer input waveform 7 with reduced noise. It is then applied to a phase discrimination automatic equalizer 4 to produce a peak shift-free zero-crossing detection waveform 8 and a gating waveform 9, and reproduced data 6 is produced by a phase discriminator 5 to which waveforms 8 and 9 are applied. The magnetic head 1 may be either an inductive head or an MR (magnetoresistive) head. The AGC 2 may be separate from a pre-amplifier, and the order thereof with respect to the LPF 3 may be reversed.

Figure 3:
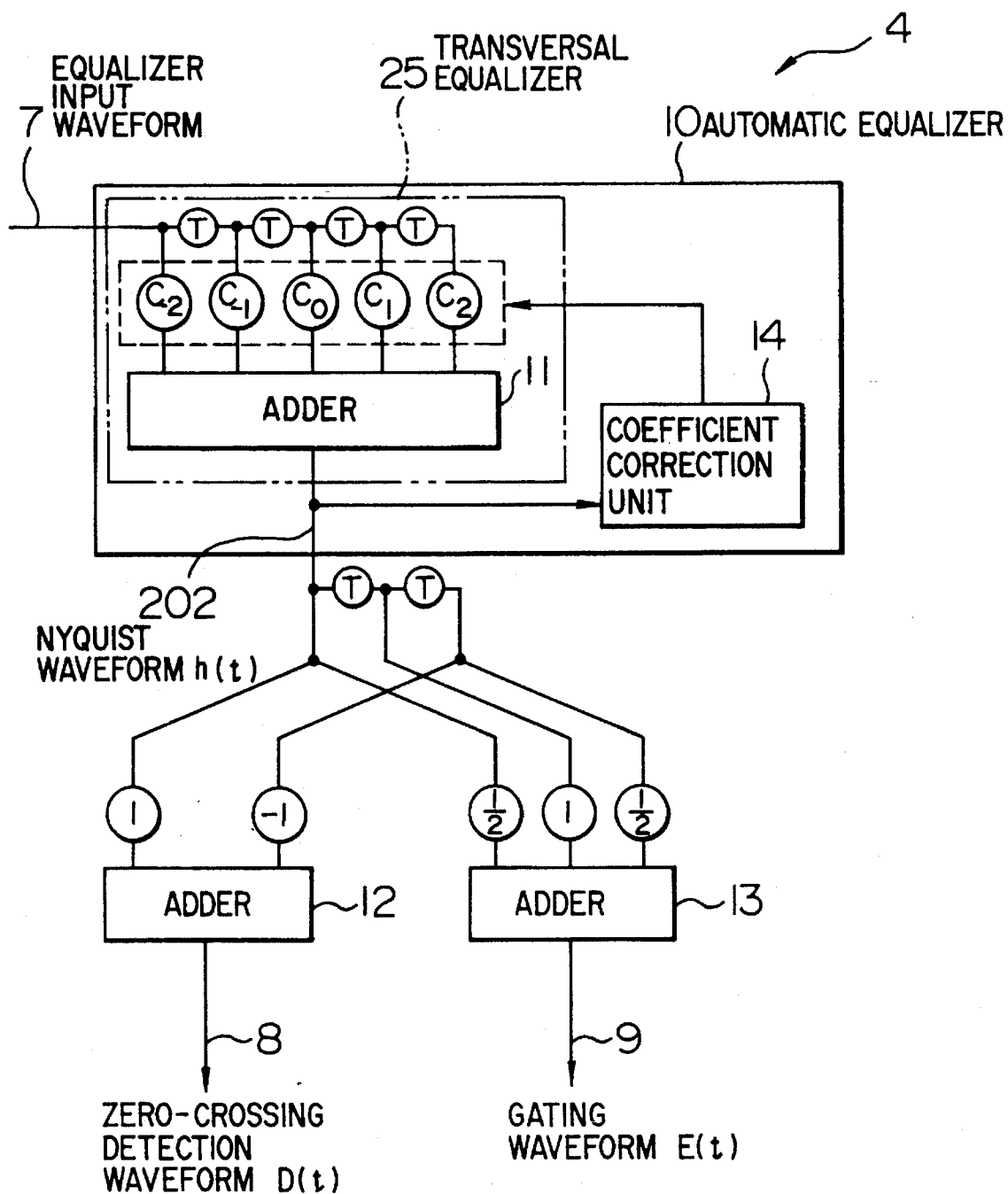
FIG. 3 shows a configuration of a phase discrimination automatic equalizer of a magnetic recording and reproducing apparatus of the present invention.

FIG. 3 shows a specific configuration of the phase discrimination automatic equalizer 4. The equalizer input waveform 7 is applied to a transversal equalizer 25 to produce a Nyquist waveform h(t) 202. A tap coefficient C is automatically modified by a coefficient correction unit 14 so that it is converged to an optimum coefficient. An algorithm of the coefficient correction unit 14 may use a well-known MSE (mean square error) method or ZF (zero forcing) method. Information required for the coefficient correction may differ from algorithm to algorithm so that the wiring may be modified appropriately even if the wiring differs from that shown. For example, the equalizer input waveform 7 is essential in the MSE method, and the equalizer output waveform only is sufficient in the ZF method. Identification data to be used by the coefficient correction unit 14 may be determined by the coefficient correction unit 14 or the phase discriminator 5. After the Nyquist waveform 202 has been produced, it is delayed by 2-bit periods and the zero-crossing waveform 8 and the gating waveform 9 are produced by the adders 12 and 13. The automatic equalizer 10 is identical to the automatic equalizer for amplitude detection signal processing frequently used in a communication field. FIG. 3 shows an example of 5-tap amplitude, detection signal processing automatic equalization, although the number of taps is determined by a constraint of characteristics of the magnetic head and the magnetic disk and a circuit scale, and the present invention does not intend to limit the number of taps, and any number of taps may be used. This is also true in the embodiments described below.

Another configuration of the phase discrimination automatic equalizer 4 is shown in FIG. 4. The configuration of FIG. 4 is essentially identical to that of FIG. 3 except for the coefficient correction unit 14. The coefficient correction unit 14 of FIG. 4 determines a coefficient from the zero-crossing detection waveform 8. The coefficient is corrected such that the amplitude sequence of the zero-crossing detection waveform 8 corresponding to the bit "1" of the reproduced output waveform (isolated waveform) corresponding to the isolated magnetization reversal is "1, 0, −1". The coefficient may be determined from information of the gating waveform 9, although this is not shown. In this case, the coefficient is corrected such that the amplitude sequence of the gating waveform 9 for the bit "1" of the isolated waveform is "0.5, 1, 0.5".

Figure 5:
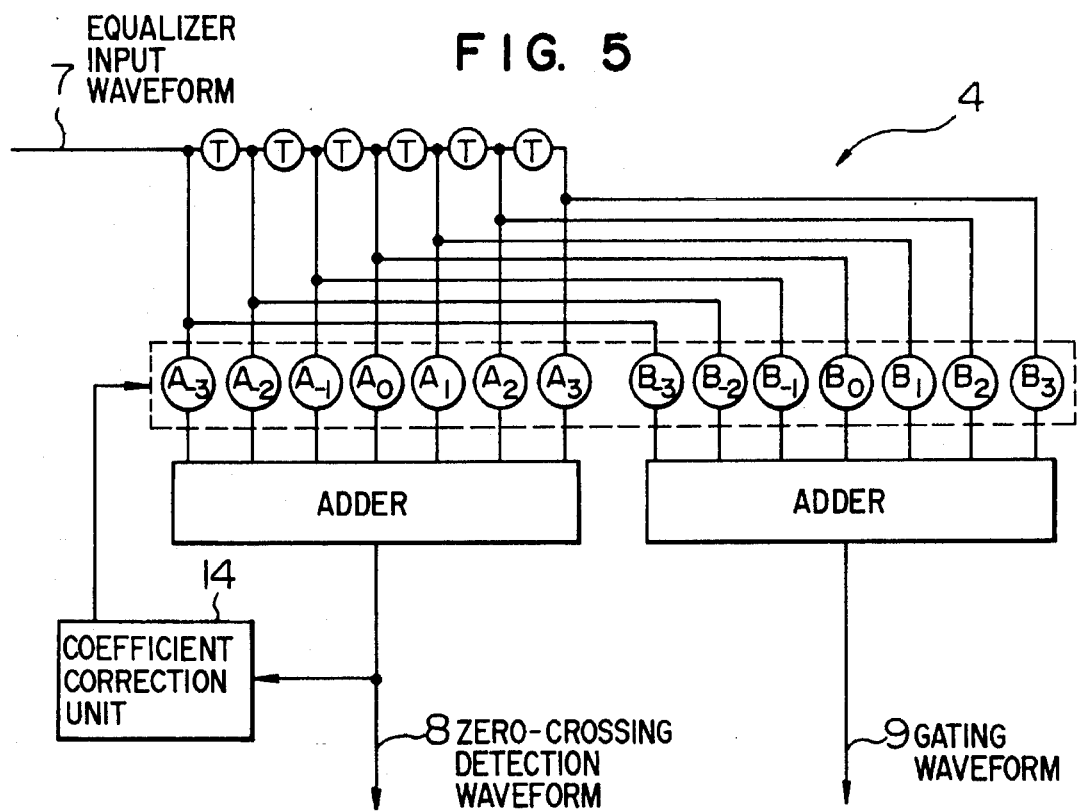
FIG. 5 shows still another configuration of the phase discrimination automatic equalizer of the magnetic recording and reproducing apparatus of the present invention.

Another configuration of the phase discrimination automatic equalizer 4 is shown in FIG. 5. In FIG. 5, the adder is of one stage, and the zero-crossing detection waveform 8 and the gating waveform 9 are produced in one time. Tap coefficients A and B are set to have the following relation with a tap coefficient C of FIG. 3.

$A_{-3} = C_{-2}$  $B_{-3} = 0.5C_{-2}$
$A_{-2} = C_{-1}$  $B_{-2} = 0.5C_{-1} + C_{-2}$
$A_{-1} = C_0 - C_{-2}$  $B_{-1} = 0.5C_0 + C_{-1} + 0.5C_{-2}$
$A_0 = C_1 - C_{-1}$  $B_0 = 0.5C_1 + C_0 + 0.5C_{-1}$
$A_1 = C_2 - C_0$  $B_1 = 0.5C_2 + C_1 + 0.5C_0$
$A_2 = -C_1$  $B_2 = C_2 + 0.5C_1$
$A_3 = -C_2$  $B_3 = 0.5C_2$

In the present embodiment, the coefficient may be determined from either information of the zero-crossing detection waveform 8 or information of the gating waveform 9.

Figure 6:
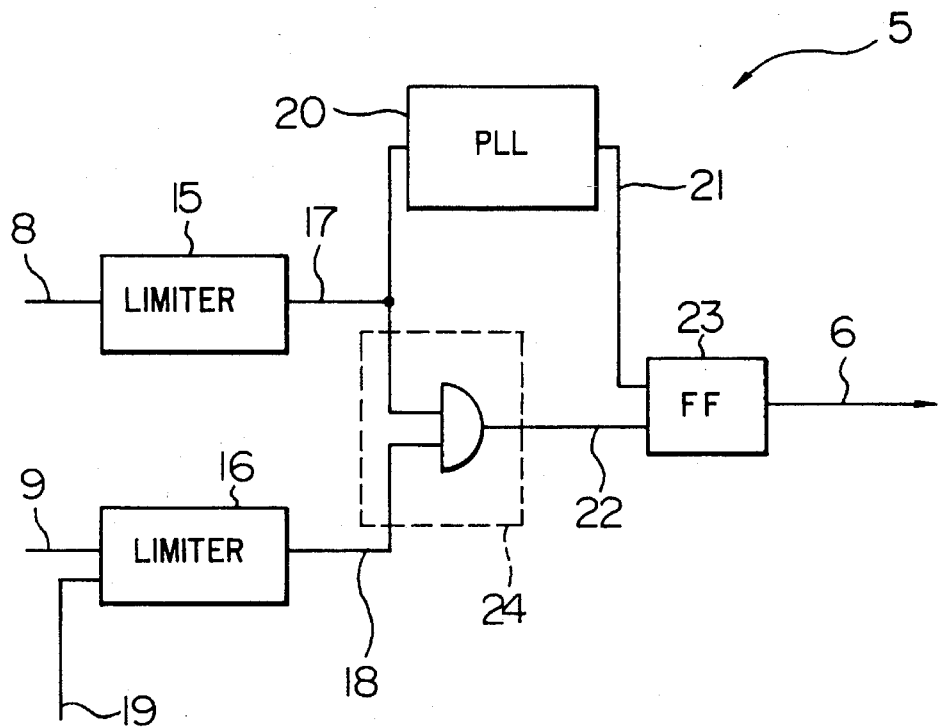
FIG. 6 shows a configuration of a phase discrimination circuit of the magnetic recording and reproducing apparatus of the present invention.

FIG. 6 shows a configuration of a phase discriminator 5 in the present embodiment. The zero-crossing detection waveform 8 and the gating waveform 9 are applied to limiters 15 and 16, respectively, to produce a zero-crossing pulse 17 and a gating pulse 18. The zero-crossing pulse 17 is then applied to a PLL (phase locked loop) circuit 20 to establish a discrimination window 21. On the other hand, only a correct read pulse 22 is extracted by the zero-crossing pulse 17 and the gating pulse 18, and the reproduced data 6 is discriminated as data "1" or "0" by a flip-flop 23. Only a basic configuration of the phase discriminator 5 of the present embodiment is shown, and various modifications may be made. For example, while a simple AND gate is shown in a read pulse extraction unit 24, preferential extraction of the read pulse may be done by a flip-flop. Further, while only one slice level 19 is shown in a generator of the gating pulse 18, a plurality of slice levels may be used so that the read pulse extraction unit 24 can extract the read pulse 22 more correctly.

In the magnetic recording and reproducing method which uses the phase discriminator of the present invention, it is possible to attain the zero peak shift, which has been difficult to attain in the prior art, in the reproduced output waveform at the phase discrimination point corresponding to the isolated magnetization reversal, by only the phase discrimination transversal equalizer without using the differentiation circuit, and the discrimination reproduction performance in the magnetic recording and reproduction is significantly improved. Accordingly, the recording density and the reliability of the magnetic recording and reproducing apparatus are improved.

What is claimed is:

1. A magnetic recording and reproducing method using a phase discrimination system, said method comprising the steps of:

detecting an output waveform corresponding to a magnetization reversal recorded on a magnetic recording medium;

producing a Nyquist waveform having a sampling time with a phase discrimination time interval (T) based on said output waveform;

producing a waveform staggered from said Nyquist waveform by an integral multiple of the phase discrimination time interval (T) and of opposite polarity to said Nyquist waveform;

producing from said Nyquist waveform and said staggered waveform a detection waveform having zero amplitude at phase discrimination times corresponding to bit "1" of said output waveform and non-zero amplitude at phase discrimination times corresponding to bit "0" of said output waveform and having zero amplitude in said output waveform at other phase discrimination times;

producing a gating output for extracting zero-crossing points of said detection waveform from said Nyquist waveform; and detecting a reproduced signal from the zero-crossing points of said detection waveform based on said detection waveform and said gating output.

2. A magnetic recording and reproducing method according to claim 1 wherein said output waveform is obtained by gain-controlling and low-pass-filtering a waveform obtained from the magnetic recording medium.

3. A magnetic recording and reproducing apparatus using a phase discrimination system, said apparatus comprising:

means for detecting an output waveform corresponding to a magnetization reversal recorded on a magnetic recording medium;

means for generating a Nyquist waveform having a sampling time with a phase discrimination time interval (T) based on said output waveform;

means for generating a waveform staggered from said Nyquist waveform by an integral multiple of said phase discrimination time interval (T) and of opposite polarity to said Nyquist waveform;

means for producing from said Nyquist waveform and said staggered waveform a detection waveform having zero amplitude at phase discrimination times corresponding to bit "1" of said output waveform and non-zero amplitude at phase discrimination times corresponding to bit "0" of said output waveform and having zero amplitude in said output waveform at other phase discrimination times;

means for producing a gating output for extracting zero-crossing points of said detection waveform from said Nyquist waveform; and means for detecting a reproduced signal from the zero-crossing points of said detection waveform based on said detection waveform and said gating output.

4. A magnetic recording and reproducing method for reproducing a digitally recorded signal by using a phase discrimination system, said method comprising the steps of:

(a) applying a reproduced output waveform corresponding to an isolated magnetization reversal reproduced by a magnetic head to a phase discrimination transversal equalizer to transform the reproduced output waveform to a dy-bit waveform which is a waveform for a zero-crossing detection; and (b) discriminating a zero-crossing point of said dy-bit waveform as bit "1";

wherein step (a) comprises adding a plurality of Nyquist waveforms having positive and negative polarities and staggered in time.

5. A magnetic recording and reproducing method according to claim 4 wherein step (a) further comprises passing the reproduced output waveform through an automatic gain controller and a low pass filter to the phase discrimination transversal equalizer.

6. A magnetic recording and reproducing apparatus for reproducing a digitally recorded signal by using a phase discriminator, said apparatus comprising:

a phase discrimination transversal equalizer for transforming a reproduced output waveform of a magnetic head corresponding to an isolated magnetization reversal to a dy-bit waveform which is a waveform for a zero-crossing detection; and a signal processing circuit for discriminating a zero-crossing point of said dy-bit waveform as bit "1";

wherein said phase discrimination transversal equalizer includes a signal processing circuit for adding a plurality of Nyquist waveforms having positive and negative polarities and staggered in time.

7. A magnetic recording and reproducing apparatus according to claim 6 further comprising an automatic gain controller and a low pass filter for applying the reproduced output waveform to the phase discrimination transversal equalizer.

8. A magnetic recording and reproducing method for reproducing a digitally recorded signal by using a phase discrimination system, said method comprising the steps of:

(a) transforming a reproduced output waveform corresponding to an isolated magnetization reversal reproduced by a magnetic head to a dy-bit waveform which is a waveform for a zero-crossing detection with a first phase discriminating transversal equalizer without using a differentiation circuit, to produce a Nyquist waveform having such a tap interval that a bit interval after the modulation is equal to T;

(b) delaying the output waveform of said first equalizer by 2T;

(c) adding two Nyquist waveforms before and after the delaying of step (b) with opposite polarities with a second phase discrimination transversal equalizer to produce a zero-crossing detection waveform; and (d) discriminating the zero-crossing point as bit "1".

9. A magnetic recording and reproducing method according to claim 8, further comprising adding the 2T-delayed output waveform of step (b) with one-half tap coefficient for adjacent taps to a center tap of the Nyquist waveform of step (a) to produce a gating waveform.

10. A magnetic recording and reproducing method according to claim 8, wherein step (a) comprises automatically producing the Nyquist waveform with a phase discrimination automatic equalizer.

11. A magnetic recording and reproducing method according to claim 10, wherein step (a) further comprises equalizing the reproduced waveform to produce one transversal Nyquist waveform having such a tap interval that a bit interval after the modulation is equal to T such that an amplitude sequence at the bit interval T in the reproduced waveform corresponding to an isolated magnetization reversal is "1, 0, −1".

12. A magnetic recording and reproducing method according to claim 11, wherein step (a) further comprises using a one-to-seven modulation method in which a minimum zero run length is one.

13. A magnetic recording and reproducing apparatus for reproducing a digitally recorded signal by using a phase discriminator, said apparatus comprising:

a first signal processing circuit, including an automatic gain controller and a low pass filter, for receiving a reproduced output waveform of a magnetic head corresponding to an isolated magnetization reversal;

a phase discrimination transversal equalizer for transforming the reproduced waveform to a dy-bit waveform which is a waveform for a zero-crossing detection, said phase discrimination transversal equalizer including a first phase discrimination transversal equalization circuit for producing a Nyquist waveform having such a tap interval that a bit interval after the modulation is equal to T, delay means for delaying the output waveform of said equalizer by 2T, and a second phase discrimination transversal equalization circuit for adding two Nyquist waveforms before and after said delay means with opposite polarities to produce a zero-crossing detection waveform; and a second signal processing circuit for discriminating a zero-crossing point of said dy-bit waveform as a bit "1".

14. A magnetic recording and reproducing apparatus according to claim 13, further comprising a third phase discrimination transversal equalization circuit for adding the 2T-delayed output waveform with one-half tap coefficient for adjacent taps to a center tap of the undelayed Nyquist waveform to produce a gating waveform.

15. A magnetic recording and reproducing apparatus according to claim 14, wherein said first phase discrimination transversal equalization circuit is a phase discrimination automatic equalizer for automatically producing the Nyquist waveform.

16. A magnetic recording and reproducing apparatus according to claim 15, wherein one of said equalization circuits comprises an automatic equalizer for producing one transversal Nyquist waveform having such a tap interval that a bit interval after the modulation is equal to T, and a signal processor for equalizing the signal such that an amplitude sequence at the bit interval T in the reproduced waveform corresponding to an isolated magnetization reversal is "1, 0, −1".

17. A magnetic recording and reproducing apparatus according to claim 16 further comprising a signal processing circuit for performing a one-to-seven modulation method in which a minimum zero run length is one.

18. A magnetic recording and reproducing method for reproducing a digitally recorded signal by using a phase discrimination system, said method comprising the steps of:

(a) applying a reproduced output waveform corresponding to an isolated magnetization reversal reproduced by a magnetic head to a first phase discriminating transversal equalizer to transform the reproduced output waveform to a dy-bit waveform which is a waveform for a zero-crossing detection;

(b) producing a Nyquist waveform having such a tap interval that a bit interval after the modulation is equal to T;

(c) delaying the output waveform of said first equalizer by 2T;

(d) adding two Nyquist waveforms before and after the delaying of step (c) with opposite polarities with a second phase discrimination transversal equalizer to produce a zero-crossing detection waveform; and (e) discriminating the zero-crossing point as bit "1".

19. A magnetic recording and reproducing method according to claim 18 further comprising adding the 2T-delayed output waveform of step (c) with one-half tap coefficient for adjacent taps to a center tap of the undelayed Nyquist waveform of step (b) to produce a gating waveform.

20. A magnetic recording and reproducing method according to claim 18, wherein step (b) comprises automatically producing the Nyquist waveform with a phase discrimination automatic equalizer.

21. A magnetic recording and reproducing method according to claim 20, wherein step (b) further comprises equalizing the reproduced waveform to produce one transversal Nyquist waveform having such a tap interval that a bit interval after the modulation is equal to T such that an amplitude sequence at the bit interval T in the reproduced waveform corresponding to an isolated magnetization reversal is "1, 0, −1".

22. A magnetic recording and reproducing method according to claim 21, wherein step (b) further comprises using a one-to-seven modulation method in which a minimum zero run length is one.

* * * * *